No. 755,659. Patented March 29, 1904.

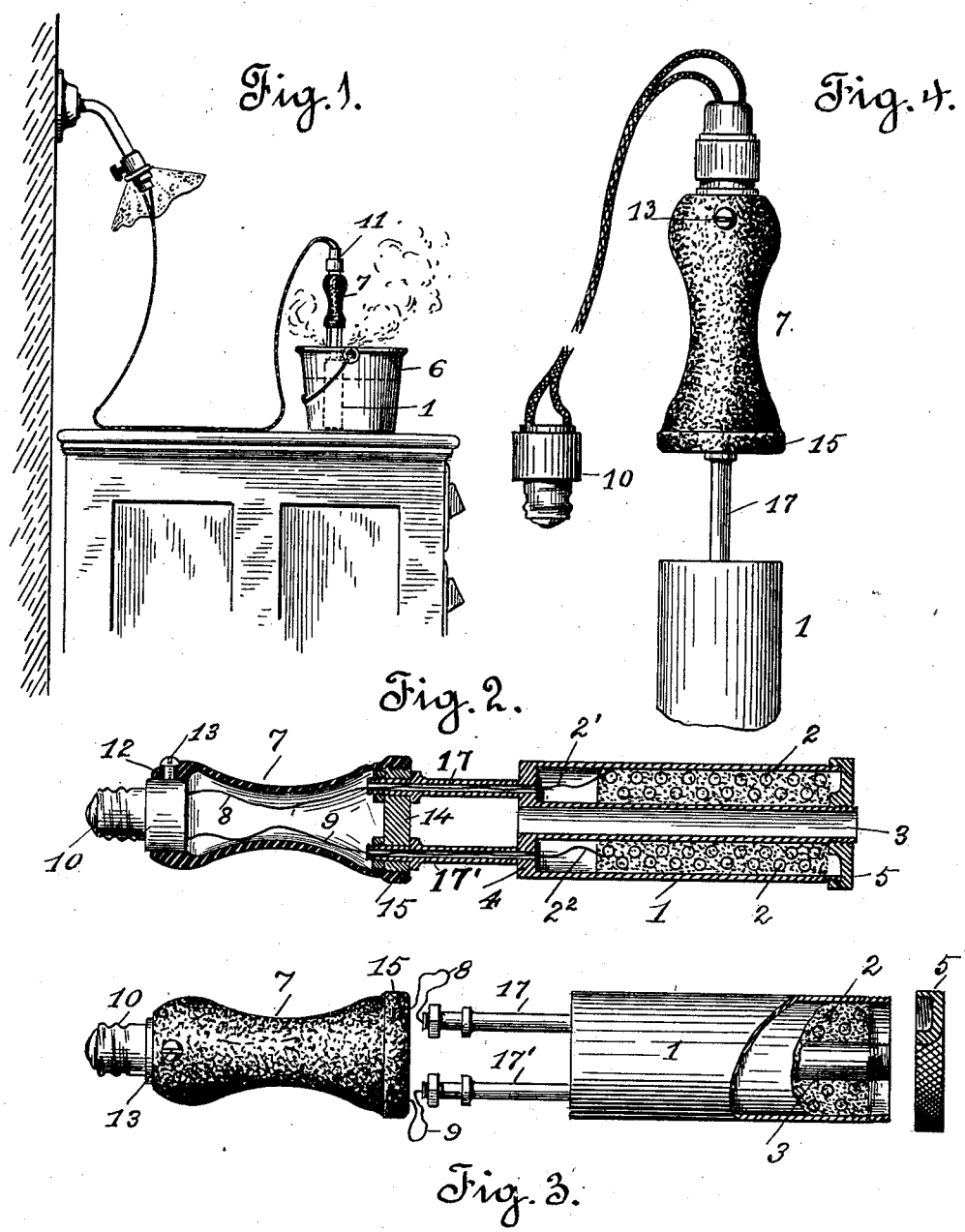

UNITED STATES PATENT OFFICE.

JAMES F. HATHAWAY, OF SAN FRANCISCO, CALIFORNIA, ASSIGNOR OF TWO-THIRDS TO FELIX B. MULGREW AND JULIUS M. ALEXANDER, OF SAN FRANCISCO, CALIFORNIA.

ELECTRIC WATER-HEATER.

SPECIFICATION forming part of Letters Patent No. 755,659, dated March 29, 1904.

Application filed August 10, 1903. Serial No. 168,867. (No model.)

*To all whom it may concern:*

Be it known that I, JAMES F. HATHAWAY, a citizen of the United States, residing in the city and county of San Francisco, State of California, have invented certain new and useful Improvements in Electric Water-Heaters; and I do hereby declare the following to be a full, clear, and exact description of the same.

The present invention relates to an improved heater which may be readily attached to an ordinary electric-lighting circuit—such as is found in houses, railway-cars, and steamboats—and used for heating water within a bucket, bowl, or pitcher of water, into which the heater is deposited for the purpose of quickly heating a quantity of water where it is desired to obtain hot water for any desired purpose, the object of the invention being to provide a simple and efficient heater mainly adapted for the use of travelers, by the use of which a person may with little trouble connect the heater to the electric-light attachment, so as to obtain the necessary electricity to operate the heater, which, as stated, is dropped into the water desired to be heated for bathing or any desired purpose.

Travelers and occupants of boarding-houses are ofttimes placed to great inconvenience and annoyance by being unable to obtain hot water when desired, and it is this annoyance which the present invention is designed to obviate.

To comprehend the invention, reference should be had to the accompanying sheet of drawings, wherein—

Figure 1 is a view of the heater attached to the socket of an ordinary electric drop-light. Fig. 2 is a longitudinal sectional view of the heater detached. Fig. 3 is a detail view of the heater detached or separated, and Fig. 4 is a detail broken view of the heater with a flexible connecting-cord attached thereto.

The numeral 1 is used to indicate the outer casing of the heater, within which is located the heating-coil 2. This coil surrounds a hollow core 3, which extends through the head 4 of the casing and onto the lower end of which screws the bottom 5 of the casing, which also screws onto the lower end of the said casing. These parts may be said to constitute the body of the heater, which is designed to be placed into the receptacle 6, containing the water to be heated. By forming the body with a hollow core 3, which extends through the bottom 5, the water is permitted to enter within the body of the heater to a height equal to the depth at which the heater is placed into the water—say about two-thirds ($\frac{2}{3}$) the length of the body portion. By this manner of constructing the heater-body the water is exposed to the outer heated surface of the metallic casing 1 and the inner heated surface of the hollow metallic core 3, a greater heating-surface being thus provided than where the end of the body is entirely closed against admission of the water to the inner surface thereof. The body is provided with a suitable handle 7, through which extend the insulated wires 8 9. These wires lead from the screw-coupling 10, which screws into the socket 11 of the electric attachment when the bulb has been removed therefrom. In the present case the handle is formed of vulcanized rubber and the coupling 10 is fitted within an end socket 12, being held therein by means of the set-screws 13. The lower ends of the wires 8 9 extend through a metallic plate 14, secured within the end socket 15 by means of the set-screws 16. It will be understood that any other suitable form of handle may be made use of; but the one described is preferred owing to its cheapness and durability.

To the plate 14 are attached the connecting-tubes 17 17', which are attached to the cap or head 4 of the casing and through which extend the wires 8 9, which engage with the wires 2' 2² of the heating-coil 2. Connection is thus established for the electric circuit when the switch of the electric-lighting device is closed.

It will be understood that the coupling 10 may be connected to the handle 7 by means of a flexible cord, through which the wires are run, Fig. 4 of the drawings. This is only required in case of a drop electric light not being present.

In case of the heating-coil becoming damaged or worn out by use the same may be readily removed by unscrewing the bottom of the casing and a new coil inserted in place thereof.

The described device is simple, occupies but little space, inexpensive, and light, all of which adapts the same to the use of travelers, as it provides a convenient means for quickly heating water for shaving, washing, or any desired purpose.

I am aware that electric coil-heaters have heretofore been employed for the heating of water; but the weight thereof alone precludes the same being put to the use for which the described heater is designed.

Having thus described the invention, what is claimed as new, and desired to be protected by Letters Patent, is—

1. An electric heater, the same comprising an outer casing, an interior hollow core extending through the head and bottom of the casing, an inner detachable heating-coil interposed between the core and casing and detachable means forming connection between the coil and a source of electrical supply.

2. An electric heater, the same comprising an outer casing, a detachable heating-coil arranged therein, a handle, detachable means forming connection between the handle and a source of electrical supply, and connection between said means and the heating-coil within the casing.

3. An electric heater, the same comprising an outer casing, a hollow core extending therethrough, an inner heating-coil interposed between the core and casing, detachable bottom for the casing having a screw-threaded engagement with the core and casing, a handle, connection between the handle and the heating-coil, and means for connecting the handle with a source of electrical supply.

4. An electric heater, comprising an outer casing, an inner hollow core integral with the head of the casing and extending slightly beyond the bottom thereof, a detachable bottom centrally apertured to receive the lower end of the core, a heating-coil interposed between the core and the interior surface of the casing, and means forming a connection between the coil and a source of electrical supply.

In witness whereof I have hereunto set my hand.

JAMES F. HATHAWAY.

Witnesses:
F. B. MULGREW,
J. M. ALEXANDER.